(12) United States Patent
Orenstien et al.

(10) Patent No.: US 10,120,684 B2
(45) Date of Patent: *Nov. 6, 2018

(54) INSTRUCTIONS AND LOGIC TO PERFORM MASK LOAD AND STORE OPERATIONS AS SEQUENTIAL OR ONE-AT-A-TIME OPERATIONS AFTER EXCEPTIONS AND FOR UN-CACHEABLE TYPE MEMORY

(71) Applicant: Intel Corporation, Santa Clara, CA (US)

(72) Inventors: Doron Orenstien, Hiafa (IL); Zeev Sperber, Zichron Yackov (IL); Robert Valentine, Kiryat Tivon (IL); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 13/793,529

(22) Filed: Mar. 11, 2013

(65) Prior Publication Data

US 2013/0191615 A1    Jul. 25, 2013

Related U.S. Application Data

(63) Continuation of application No. 12/005,575, filed on Dec. 27, 2007, now Pat. No. 9,529,592.

(51) Int. Cl.
  *G06F 9/312*     (2018.01)
  *G06F 9/30*      (2018.01)
  (Continued)

(52) U.S. Cl.
  CPC ...... *G06F 9/30043* (2013.01); *G06F 9/30018* (2013.01); *G06F 9/30032* (2013.01);
  (Continued)

(58) Field of Classification Search
  CPC .. G06F 7/764; G06F 9/30018; G06F 9/30032; G06F 9/30036; G06F 9/30043; G06F 9/3861; G06F 15/8061
  (Continued)

(56) References Cited

U.S. PATENT DOCUMENTS

4,881,168 A    11/1989  Inagami et al.
5,185,871 A *   2/1993  Frey ...................... G06F 9/3834
                                                    711/124
(Continued)

FOREIGN PATENT DOCUMENTS

CN    1490721 A    4/2004
CN    1983235 A    6/2007

OTHER PUBLICATIONS

Office Action and Search Report received for Chinese Patent Application No. 201210457442.X, dated Jul. 24, 2014, 22 pages of Office Action and Search Report including 14 pages of English Translation.

(Continued)

*Primary Examiner* — David J. Huisman
(74) *Attorney, Agent, or Firm* — NDWE, LLP

(57) ABSTRACT

Logic is provided to receive and execute a mask move instruction to transfer unmasked data elements of a vector data element including a plurality of packed data elements from a source location to a destination location, subject to mask information for the instruction. The logic is to execute a speculative full width operation, and if an exception occurs is to perform operations sequentially or one at a time. Other embodiments are described and claimed.

9 Claims, 7 Drawing Sheets

(51) Int. Cl.
*G06F 9/38* (2018.01)
*G06F 15/80* (2006.01)

(52) U.S. Cl.
CPC ...... *G06F 9/30036* (2013.01); *G06F 9/30072* (2013.01); *G06F 9/30145* (2013.01); *G06F 9/3842* (2013.01); *G06F 9/3861* (2013.01); *G06F 15/8061* (2013.01)

(58) Field of Classification Search
USPC .................................. 712/5, 223, 224, 225
See application file for complete search history.

(56) References Cited

U.S. PATENT DOCUMENTS

| | | | |
|---|---|---|---|
| 5,511,210 | A | 4/1996 | Nishikawa et al. |
| 5,577,200 | A * | 11/1996 | Abramson .......... G06F 9/30043 |
| | | | 712/200 |
| 6,052,769 | A | 4/2000 | Huff et al. |
| 6,076,153 | A | 6/2000 | Grochowski et al. |
| 6,173,393 | B1 | 1/2001 | Palanca et al. |
| 6,446,198 | B1 | 9/2002 | Sazegari |
| 6,484,255 | B1 | 11/2002 | Dulong |
| 6,523,108 | B1 | 2/2003 | James et al. |
| 6,952,478 | B2 | 10/2005 | Lee et al. |
| 7,464,255 | B1 | 12/2008 | Tan et al. |
| 2002/0078011 | A1 | 6/2002 | Lee et al. |
| 2004/0054879 | A1 | 3/2004 | Macy et al. |
| 2005/0027969 | A1 | 2/2005 | Simon et al. |
| 2005/0125639 | A1 | 6/2005 | Symes et al. |
| 2007/0143575 | A1 | 6/2007 | Jourdan et al. |
| 2009/0100247 | A1 | 4/2009 | Moyer et al. |
| 2009/0172348 | A1 | 7/2009 | Cavin |

OTHER PUBLICATIONS

U.S. Appl. No. 11/524,852, filed Sep. 20, 2006, entitled "Instruction and Logic for Performing a Dot-Product Operation," by Ronen Zohar, et al.
Christos Kozyrakis, et al., "Overcoming the Limitations of Conventional Vector Processors," SIGARCH Comput. Archit. News, 2003, pp. 399-409.
Final Office Action received for U.S. Appl. No. 12/005,575, dated Dec. 27, 2010, 27 pages.
Final Office Action received for U.S. Appl. No. 12/005,575, dated Jul. 10, 2014, 16 pages.
Final Office Action received for U.S. Appl. No. 12/005,575, dated Oct. 8, 2013, 23 pages.
Non-Final Office Action received for U.S. Appl. No. 12/005,575, dated Apr. 12, 2013, 33 pages.
Non-Final Office Action received for U.S. Appl. No. 12/005,575, dated Feb. 25, 2014, 21 pages.
Non-Final Office Action received for U.S. Appl. No. 12/005,575, dated Jul. 20, 2010, 20 pages.
Office Action received for Chinese Patent Application No. 200810189863.2, dated Apr. 16, 2012, 6 pages of English Translation and 4 pages of Chinese Office Action.
Non Final Office Action received for U.S. Appl. No. 12/005,575, dated Dec. 18, 2015, 17 Pages.
Notice of Allowance received for U.S. Appl. No. 12/005,575, dated Aug. 17, 2016, 7 Pages.
Notice of Allowance received for Chinese Patent Application No. 201210457442.X, dated Sep. 6, 2015, 4 pages of Notice of Allowance including 2 pages of English Translation.
Notice of Allowance received for Chinese Patent Application No. 200810189863.2, dated Aug. 30, 2012, 7 Pages of Notice of Allowance including 3 Pages of English Translation.
Supplemental Amendment received for U.S. Appl. No. 12/005,770, filed May 19, 2011, 10 Pages.
Office Action received for Chinese Patent Application No. 200810189863.2, dated Aug. 24, 2011, 33 pages of Chinese Office Action including 22 pages of English Translation.
Office Action received for German Patent Application No. 102008061062.3, dated Jan. 23, 2014, 15 Pages of Office Action including 6 Pages of English Translation.
Final Office Action received for U.S. Appl. No. 12/005,770, dated Jan. 3, 2011, 20 pages.
Office Action received for German Patent Application No. 102008061062.3, dated Mar. 10, 2010, 4 pages of German Office Action including 2 pages of English Translation.
Non-Final Office Action received for U.S. Appl. No. 12/005,770, dated Jul. 30, 2010, 17 pages.

* cited by examiner

INSTRUCTIONS AND LOGIC TO PERFORM MASK LOAD AND STORE OPERATIONS AS SEQUENTIAL OR ONE-AT-A-TIME OPERATIONS AFTER EXCEPTIONS AND FOR UN-CACHEABLE TYPE MEMORY

This application is a continuation of U.S. patent application Ser. No. 12/005,575, filed Dec. 27, 2007, the content of which is hereby incorporated by reference.

BACKGROUND

As processor technology advances, newer software code is also being generated to run on machines with these processors. Users generally expect and demand higher performance from their computers regardless of the type of software being used. Issues can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications are drivers of microprocessor development. Accordingly, the display of images and playback of audio and video data, which are collectively referred to as content, have become increasingly popular applications for current computing devices. Such operations are computationally intensive, but offer a high level of data parallelism that can be exploited through an efficient implementation using various data storage devices, such as single instruction multiple data (SIMD) registers. A number of current architectures also require multiple operations, instructions, or sub-instructions (often referred to as "micro-operations" or "µops") to perform various mathematical operations or data transfer operations on a number of operands, thereby diminishing throughput and increasing the number of clock cycles required to perform these operations.

Masking is often used in SIMD or vectorization operations to enable a programmer to mask some part of the vectors. It is widely used for conditional operations, for the beginning/end of a vectorized loop, or for short vector support. Mask loads and stores of vector data are quite complex operations, typically requiring numerous individual instructions and clock cycles for execution. During such operations, some parts of the vectorized load/store operations (the "masked" parts) should not be executed at all. Since memory operations are typically done in blocks (e.g., load 128 bits, store 128 bits), it becomes quite challenging to support mask operations at a reasonable performance, as these block loads are done without reference to a mask.

Executing mask loads and stores using a processor architecture such as an Intel® Architecture (IA-32)-based processor is even more challenging due to misaligned loads, page/segmentation faults, data-breakpoint support, and so forth. For example, while doing 128-bit mask loads, part of the data can be located in one page while the other part can be located in another page. If one of the pages is not present, a page-fault should arise only if the part which belongs to this page is not masked. Thus, current architectures fail to adequately address efficient performance of mask load and store operations. Instead such techniques require numerous processing cycles and may cause a processor or system to consume unnecessary power in order to perform these masked operations.

DETAILED DESCRIPTION

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task, which in turn can reduce the power consumption. These instructions can speed up software performance by operating on multiple data elements in parallel. As a result, performance gains can be achieved in a wide range of applications including video, speech, and image/photo processing.

In various embodiments, individual instructions of an instruction set may be provided to enable mask load and store operations to perform more efficiently. More specifically, embodiments may provide multiple flavors of mask load and store instructions, each to enable loading of packed SIMD data from memory to a selected storage location or storing of packed SIMD data to memory from a selected source location. Embodiments may provide multiple flavors of these instructions to enable loading and storing of packed values having different bit widths from and to differently sized source and destination storages within a system. Overall, these instructions may be considered to be conditional SIMD packed load and store instructions to enable the conditional loading or storing of packed data elements based on mask values associated with the packed data elements.

Figure 1:
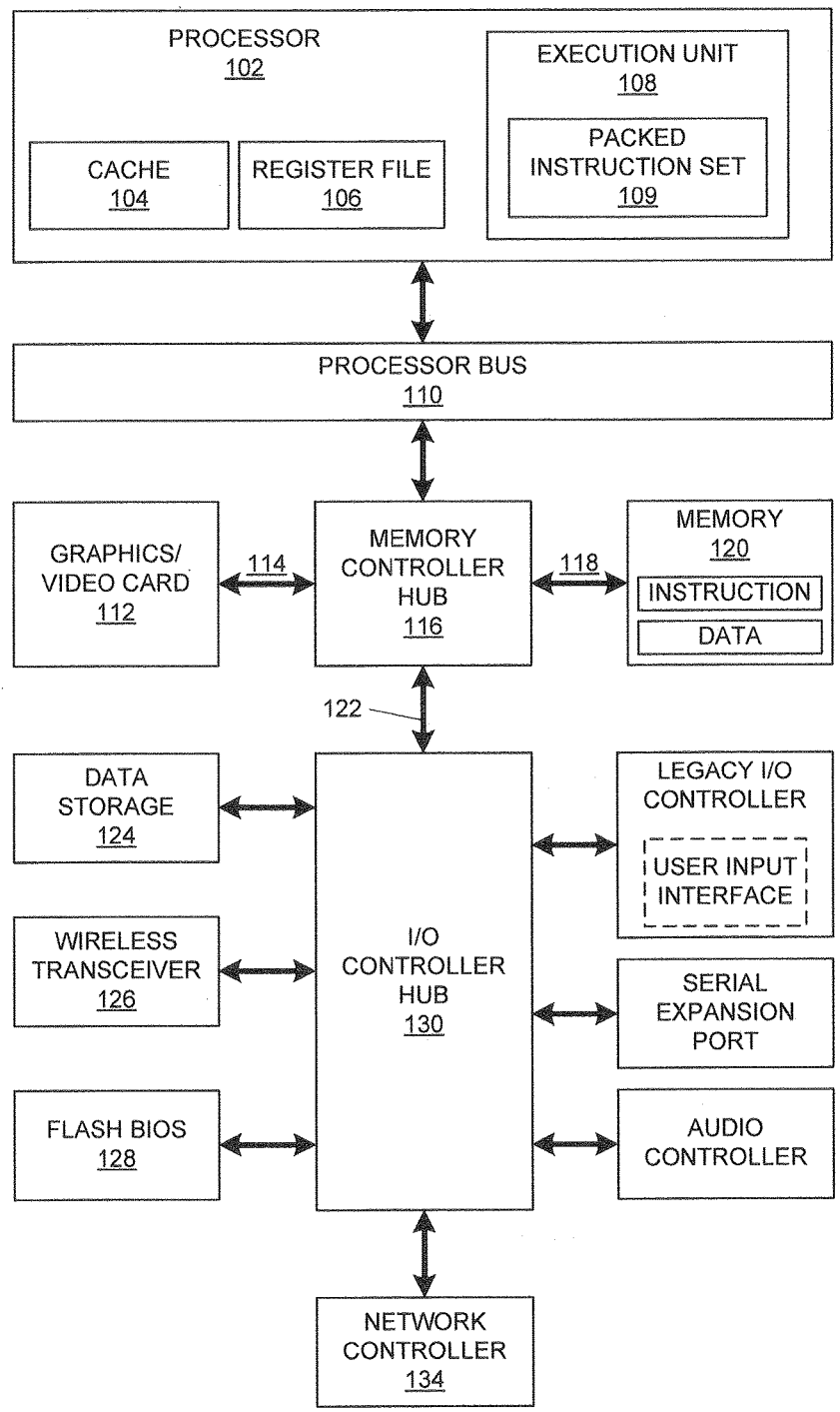
FIG. 1 is a block diagram of an exemplary computer system formed with a processor that includes logic to execute instructions for mask load and store operations in accordance with one embodiment of the present invention.

FIG. 1 is a block diagram of an exemplary computer system formed with a processor that includes execution units to execute the mask move instructions in accordance with an embodiment of the present invention. System 100 includes a component, such as a processor 102 to employ execution units including logic to perform algorithms for processing mask move operations in accordance with the present invention, such as in the embodiments described herein. System 100 is representative of processing systems based on the PENTIUM® 4, PENTIUM® Dual-Core, Core™ 2 Duo and Quad, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software. Alternative embodiments of the present invention can be used in other devices such as handheld devices and embedded applications.

Processor 102 includes one or more execution units 108 to perform an algorithm to perform mask load and store operations on SIMD data elements in accordance with an embodiment of the present invention. System 100 is an example of a hub architecture. Processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, vector or extended registers, status registers, and an instruction pointer register.

Execution unit 108, including logic to perform integer and floating point operations, also resides in the processor 102. The processor 102 also includes a microcode (ucode) read only memory (ROM) that stores microcode for certain macroinstructions. For this embodiment, execution unit 108 includes logic to handle a packed instruction set 109. In one embodiment, the packed instruction set 109 includes various instances of mask load and store instructions for efficiently handling such operations. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing those mask load and store operations on packed data. This can eliminate the need to transfer smaller units of data across the processor's data bus to perform one or more operations one data element at a time.

Alternate embodiments of an execution unit 108 can also be used in micro controllers, embedded processors, graphics devices, digital signal processors (DSPs), and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and a hub interface bus 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, a legacy I/O controller containing user input and keyboard interfaces, a serial expansion port such as Universal Serial Bus (USB), and a network controller 134. The data storage device 124 can be a hard disk drive, a floppy disk drive, a CD-ROM device, a flash memory device, or other mass storage device.

While the scope of the present invention is not limited in this regard, the mask move instructions may be applied to different data widths. For example, packed values of different bit widths may be obtained and loaded or stored. For example, 128-bit or 256-bit values may be obtained from an initial memory location corresponding to a source indicator. Within these vector data values, multiple packed data elements or fields may be present. For example, these individual data elements within the larger vector data element may take the form of double words (dword), quad words (qword), although smaller and larger data elements are also possible. Furthermore, different data types may be used such as single and double precision integer and floating point data types. Thus, in some implementations packed single-precision (PS) values may be present, while other implementations may operate on packed double-precision (PD) values.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file of one embodiment also contains extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

Generally, a data element is an individual piece of data that is stored in a single register or memory location with other data elements of the same length. In packed data sequences relating to SSEx technology, the number of data elements stored in a XMM register is 128-bits (which can be extended to greater widths, e.g., 256 bits or 512 bits) divided by the length in bits of an individual data element. As examples a 128-bit wide operand may include sixteen packed byte data elements. A byte is defined here as 8-bits of data. Information for each byte data element is stored in bit 7 through bit 0 for byte 0, bit 15 through bit 8 for byte 1, bit 23 through bit 16 for byte 2, and finally bit 120 through bit 127 for byte 15. Similarly, in packed data sequences relating to MMX and SSE technology, the number of data elements stored in an MMX register is 64-bits divided by the length in bits of an individual data element. A packed word vector can be 128-bits long and contain eight packed word data elements, with each packed word containing sixteen bits of information. A packed doubleword can be 128-bits long and contain four packed doubleword data elements, with each vector packed doubleword data element containing 32-bits of information. A packed quadword vector can be 128-bits long and contains two packed quad-word data elements. Of course, for 256-bit vectors, double the number of these data types may be present. It will be appreciated that such packed data formats may be further extended to other register lengths, for example, to 96-bits, 160-bits, 192-bits, 224-bits, 256-bits or more. Further, it is to be understood that various signed and unsigned packed data type representations may be stored in multimedia registers according to an embodiment of the present invention.

In some implementations, load forms of a conditional SIMD data transfer instruction may be used to load packed values from, e.g., 128-bit (for XMM forms) or 256-bit memory locations into a destination XMM register of a given width, e.g., using mask values which may be obtained from a vector mask register (e.g., stored in XMM0). In one embodiment, this mask may be calculated from the most significant bit of each dword (PS forms) or the most significant bit of each qword (PS forms) of the mask register. The mask may be derived as a result of a SIMD compare instruction. Such instruction sets the destination register sub-operands to either all "1" or "0". Some implementations can use one bit (e.g., a most significant bits (MSB)) of the compare destination as a mask bit. For each of the bits of the mask, if set to '0', the corresponding load will not occur, and the corresponding field of the destination location will be set to zero.

In some implementations, store forms of a conditional SIMD data transfer instruction may be used to store packed values from a source storage such as an XMM register into a destination location (e.g., a 128-bit (XMM forms) memory location) using values which may be obtained from a vector mask register, e.g., stored in XMM0. In one embodiment, this mask also may be calculated from the most significant bit of each dword (PS forms) or the most significant bit of each qword (PS forms) of the mask register. For each of the bits of the mask, if set to '0', the corresponding store will not occur, and the corresponding field of the destination location will be unchanged.

Referring now to Table 1, shown is a listing of various flavors of vector mask load and store instructions in accordance with one embodiment of the present invention. As shown in Table 1, multiple individual instructions each to perform a given conditional SIMD packed load or store operation on particular data types is shown. Each instruction also corresponds to an opcode. Instructions each take the form of an instruction name (e.g., VMASKMOVPS) followed by a destination indicator and a source indicator. For example, the first instruction of Table 1 (i.e., VMASKMOVPS) is to enable loading of packed single-precision values from a source location, namely 128-bits of memory (m128) to a destination location, namely, the XMM1 register. Furthermore, this load operation is to be performed using a mask in a predetermined location, e.g., XMM0, which may be used as a vector mask register. Note that the term YMM is used to identify registers of a wider width, e.g., 256 bits.

TABLE 1

| Opcode | Instruction | Description |
| --- | --- | --- |
| VEX 128.66 38 A6/r | VMASKMOVPS XMM1, m128 | Load packed single-precision values from mem using mask in XMM0 |
| VEX 256.66 38 A6/r | VMASKMOVPS YMM1, m256 | Load packed single-precision values from mem using mask in YMM0 |
| VEX 128.66 38 A7/r | VMASKMOVPD XMM1, m128 | Load packed double-precision values from mem using mask in XMM0 |
| VEX 256.66 38 A7/r | VMASKMOVPD YMM1, m256 | Load packed double-precision values from mem using mask in YMM0 |
| VEX 128.66 38 A8/r | VMASKMOVPS m128, XMM1 | Store packed single-precision values to mem using mask in XMM0 |
| VEX 256.66 38 A8/r | VMASKMOVPS m256, YMM1 | Store packed single-precision values to mem using mask in YMM0 |
| VEX 128.66 38 A9/r | VMASKMOVPD m128, YMM1 | Store packed double-precision values to mem using mask in XMM0 |
| VEX 256.66 38 A9/r | VMASKMOVPD m256, YMM1 | Store packed double-precision values to mem using mask in YMM0 |

Because a mask load operation in which each individual packed data element within a vector or other SIMD data element is individually loaded from memory may be relatively inefficient to implement, as checks, branches and many small (e.g., 32 bits) load operations are needed, embodiments may perform a full width load speculatively. More specifically, in order to avoid multiple individual loads of packed data elements, a full load (e.g., 128 bits (B) or 256 B) can be speculatively executed, e.g., from a regular writeback (WB) memory even if part of it is masked (and it is viewed architecturally as not-executed). This is done since loading from a WB memory location can be usually done in a speculative manner (including prefetching, etc). However to avoid any side effect from reading data from a mask location, additional steps may be taken. Examples of side effects of reading data from a mask location include security issues, non-deterministic behavior, and so forth. Thus maskloads will return zeros in masked locations. As a result, the basic flow of a mask load operation is a full load (128B, 256B) followed by an AND operation with the mask register (e.g., YMM0/XMM0 sign bits) to zero all the mask locations.

Mask load/store operation can be implemented non-speculatively using microcode (ucode) handling. However in order to gain performance benefits, hardware may issue a speculative full width load (or store). If a fault occurs (real or otherwise), the ucode handler may be performed. For example, if loads cross the end of a page (or segment) an exception may be raised only if this part is not masked, or for operations on uncachable data. In such cases, a fault (page-fault, segment-violation, data-breakpoint, etc.) may be raised, and thus the hardware generates a ucode exception. The ucode exception handler checks if the exception occurs by a mask load instruction. If the exception occurs in another instruction, the handler may execute a typical exception flow. Otherwise, it restarts the execution of the mask load instruction using a slow ucode, skipping the mask locations. Similarly, if hardware detects that the memory type is un-cacheable (UC), and thus a speculative load cannot be performed, it also goes to the exception handler to execute it slowly.

Figure 2:
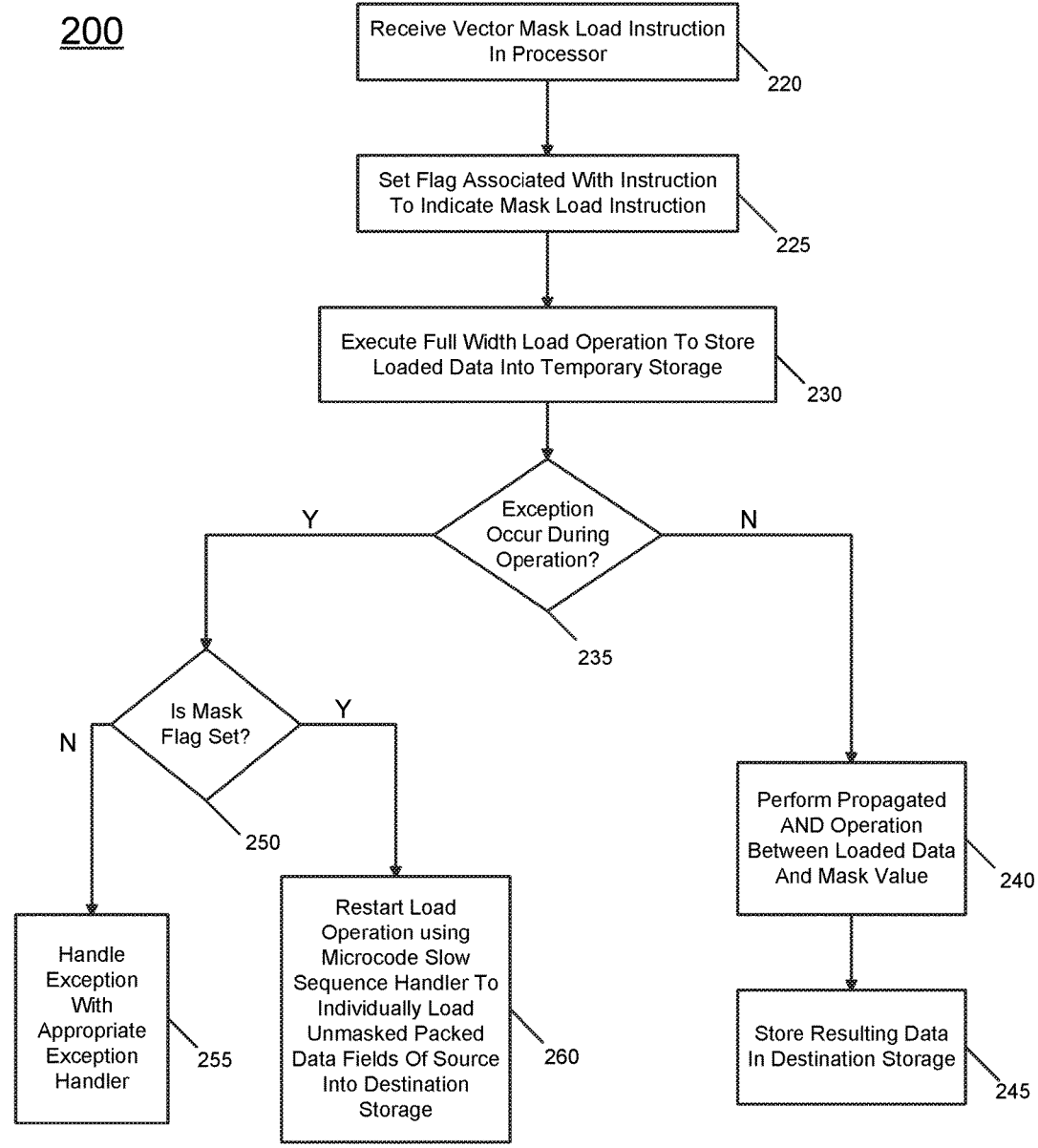
FIG. 2 is a flow diagram of a method of performing a mask load operation in accordance with one embodiment of the present invention.

Referring now to FIG. 2, shown is a flow diagram of a method for performing a mask load operation in accordance with one embodiment of the present invention. Method 200 may begin by receiving a vector mask load instruction in a processor (block 220). For example, in many implementations a user-level instruction, e.g., an instruction of an instruction set of a given processor instruction set architecture (ISA) may be received in the processor. In addition to the instruction, source and destination indicators may also be received with the instruction.

Referring still to FIG. 2, at block 225 a flag associated with the instruction may be set. More specifically, a mask load flag may be set to indicate that the corresponding instruction is a vector mask load instruction. Use of this flag will be discussed further below. Then at block 230, a full width load operation may be executed and the loaded data may be stored into a temporary storage. More specifically, the full width load operation may be a speculative load operation in which data at the source location, which may correspond to a location in memory, may be speculatively loaded into a temporary storage of the processor. For example, the data may be loaded into a non-visible temporary register.

Referring still to FIG. 2, next it may be determined whether an exception occurred during execution of the operation (diamond 235). For example, if a fault should occur during operation (e.g., a page fault segment violation, data breakpoint or so forth), an exception may be generated. If not, control passes to block 240 where an optimized mask load operation may be realized.

Referring still to FIG. 2, if no exception is detected, control passes to block 240 where a propagated AND operation may be performed between the loaded data and the mask value associated with the vector mask load instruction. More specifically, in some embodiments the mask value may correspond to multiple bits, each associated with a different packed data element of the loaded data. In one embodiment, a mask including the mask values can be calculated from the most significant bit of each dword (PS forms) or the most significant bit of each qword (PD forms) of the mask register. For each of the bits of the mask, if set to '0', the corresponding load will not occur and the corresponding field of the destination will be set to zero. Or, the destination may remain untouched for masked operands, in some implementations. By performing a propagated AND, if the corresponding bit has a "one" value, the result is the same as the data element. The result of this propagated AND operation may then be stored in the destination storage (block 245). For example, in some embodiments the destination storage may be an extended register as indicated in the destination indicator of the vector mask load instruction. The destination register may correspond to a visible register such as an extended multimedia register such as a 128-bit or a larger, 256-bit register, for example.

Referring still to FIG. 2, if an exception is detected, control passes to diamond 250 where it may be determined whether the mask flag (discussed above regarding block 225) is set. If not, the exception was generated for another instruction and thus the exception may be handled with an appropriate exception handler (block 255). For example, a hardware or software exception handler may handle the given fault.

If instead the mask flag is set, control passes to block 260, where an unoptimized (i.e., non-speculative) loading of the requested data may be performed. More specifically, this unoptimized load operation may be performed independently for each individual data element within the source. Thus at block 260, the load operation may be restarted using a microcode slow sequence handler. In this way, unmasked portions of the source may be individually loaded into the destination storage. One particular implementation of executing this microcode handler will be discussed further below with regard to FIG. 3.

Thus using the method set forth in the embodiment of FIG. 2, a conditional SIMD packed load may be performed to load a vector data element under mask into a destination storage location. As described above, some implementations may be used to load packed data elements such as packed single-precision or packed double-precision values from a source such as memory (e.g., 128-bit chunks of memory or 256-bit chunks of memory) into a destination storage such as one or more architectural registers, e.g., an extended multimedia register such as a low order portion of a 256-bit register or all of the 256-bit register. While described with the particular implementation in the embodiment of FIG. 2, the scope of the present invention is not limited in this regard.

Figure 3:
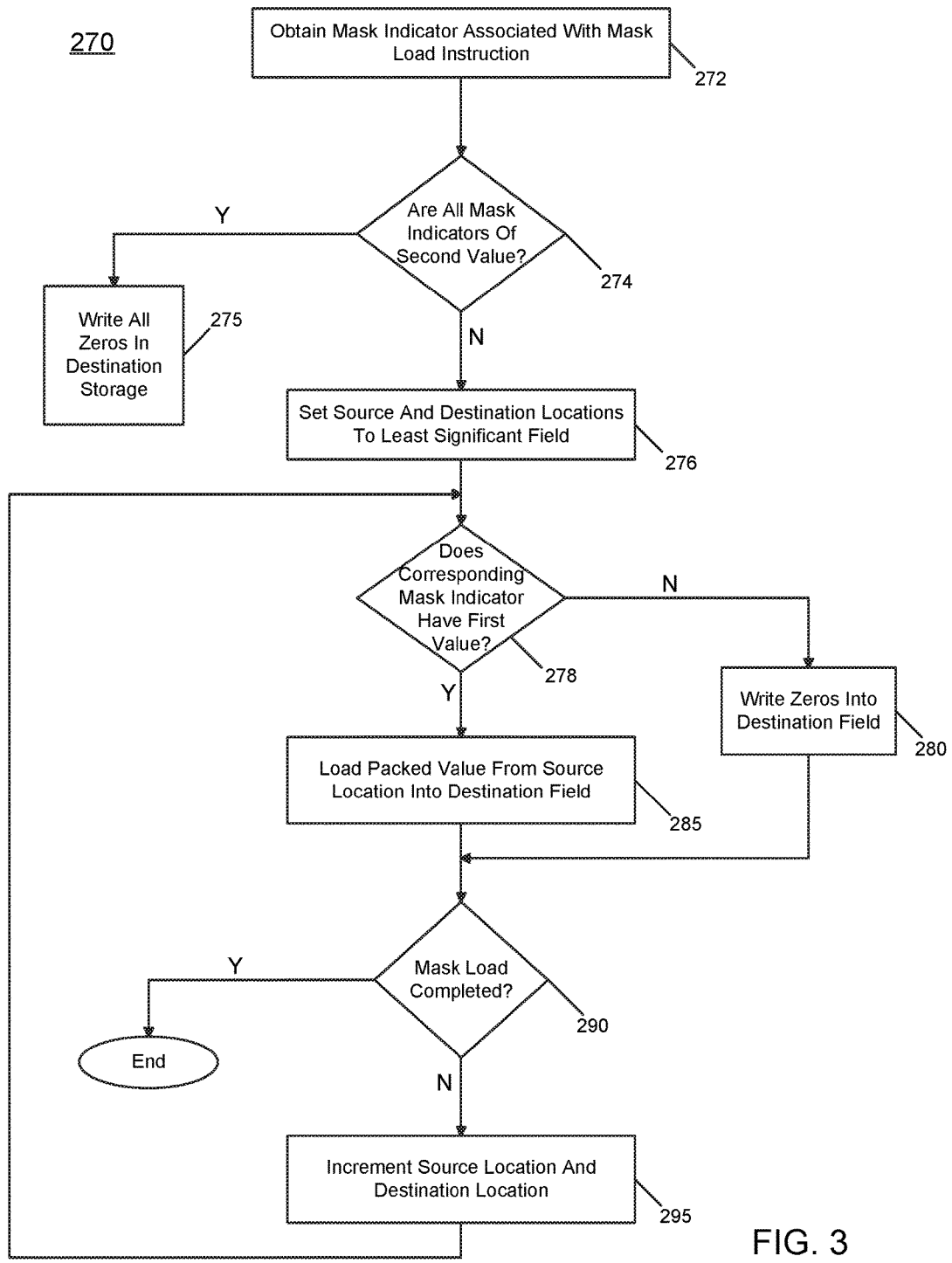
FIG. 3 is a flow diagram of a method for performing a mask load operation in accordance with another embodiment of the present invention.

Referring now to FIG. 3, shown is a flow diagram of a method for performing an unoptimized vector mask load operation in accordance with one embodiment of the present invention. Note that method 270 shown in FIG. 3 may correspond to the unoptimized load operation described above at block 260 of FIG. 2.

As shown in FIG. 3, method 270 may begin by obtaining mask indicators associated with the mask load operation (block 272). As described above, in one embodiment the mask indicators may each be a single bit associated with a different packed data element of the vector data to be loaded. From block 272, control passes to diamond 274 where it may be determined whether all mask indicators are of a second value. In one embodiment, the second value may correspond to a logic zero value, in other words the mask is set for the given corresponding data elements. If all the mask indicators are of the second value, control passes to block 275, where all zeros may be written to the destination storage. Because all of the data elements are to be masked, all zeros may be directly written and method 270 may conclude, thus enabling efficient conclusion of the load operation when all of the data is to be masked.

If at diamond 274 it is determined that all of the indicators are not of the second value, control passes to block 276, where the source and destination locations may be set to a least significant field. For example, assume the destination indicator of the vector mask load instruction is for a destination register XMM1, the destination location may be set to the lowest data element field within that register, e.g., bits [31:0]. Similarly the source location may be a low order position of a memory segment, e.g., mem0.

Control then passes to diamond 278 where it may be determined whether the corresponding mask indicator for that packed data element has a first value. For example, the first value may correspond to a one value, indicating that the given data element is to be unmasked. If not, and instead the mask indicator associated with the corresponding field has a zero value, all zeros may be written into these bits of the destination register (block 280). If instead at diamond 278 it is determined that the mask indicator is of a first value, e.g., one value, a load operation may be performed to load the packed value from the source location into the destination field (block 285). Thus a load operation may issue to enable reading of the given packed data element from the source location and loading it into the given portion of the destination location.

From both blocks 280 and 285, control may pass to diamond 290 where it may be determined whether the load has completed to the destination location. If so, method 270 may conclude. Otherwise, control passes to block 295 where the source location and destination location may be incremented. Control then passes back to diamond 278 for further execution to enable additional packed data elements of the vector data element to be loaded into the destination location, if they are unmasked. While shown with this particular implementation in the embodiment of FIG. 3, the scope of the present invention is not limited in this regard.

Referring now to Table 2, shown is pseudo-code for performing a mask load operation in accordance with one embodiment of the present invention. More specifically, Table 2 shows pseudo-code for performing a 256-bit load of packed single-precision data elements from a memory location (i.e., mem-mem+28) to a destination location (i.e., DEST [255:0]).

TABLE 2

DEST[31:0] = IF (YMM0[31]) Load_32(mem) ELSE 0
DEST[63:32] = IF (YMM0[63]) Load_32(mem + 4) ELSE 0
DEST[95:64] =IF (YMM0[95]) Load_32(mem + 8) ELSE 0
DEST[127:96] = IF (YMM0[127]) Load_32(mem + 12) ELSE 0
DEST[159:128] = IF (YMM0[159]) Load_32(mem + 16) ELSE 0
DEST[195:160] = IF (YMM0[195]) Load_32(mem + 20) ELSE 0
DEST[223:196] = IF (YMM0[224]) Load_32(mem + 24) ELSE 0
DEST[255:224] = IF (YMM0[255]) Load_32(mem + 28) ELSE 0

Thus as shown in Table 2, the slow microcode sequence may correspond to a number of individual load operations that are performed only if the corresponding mask bit for the given packed data element is set to one. Otherwise the load is not performed and the destination field is filled with zeros. Thus this sequence of load operations is ordered from low to high address. Note that any fault may cause the sequence to restart from the beginning such that the same address may be read or written multiple times.

The basic operation of a mask store instruction is similar to a mask load, as described above. Overall it may be assumed that the store will not fault and execution of a full width store operation may proceed, subject to the mask. In case of faults (like page-faults, including dummy faults and UC stores) the ucode can be activated to handle it slowly. The difference between mask-load and mask-store operations is that the memory sub-system of the processor is supplied with the mask value, such that at the end of execution (i.e., at "senior store retirement") the cache memory or other destination storage is updated only in the non-masked area. This is done by a µop flow which moves the mask bits the memory sub-system. In addition, since part of the data stored in the memory sub-system is potentially not valid (i.e., is subject to masking) the data cannot be used while waiting for execution of the mask store operations (e.g., by a load store forward operation).

Figure 4:
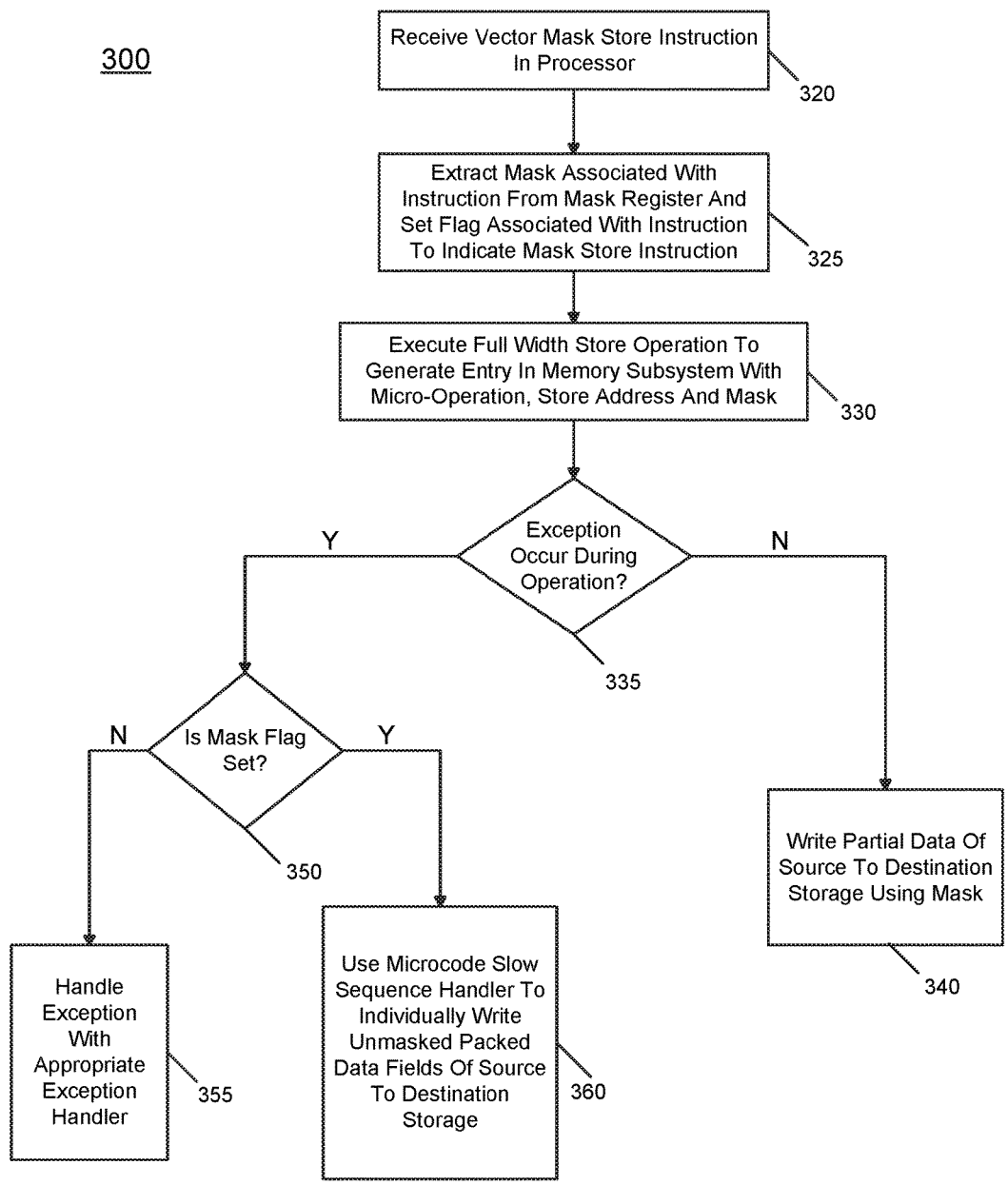
FIG. 4 is a flow diagram of a method of performing a mask store operation in accordance with one embodiment of the present invention.

Referring now to FIG. 4, shown is a flow diagram of a method for performing a mask store operation in accordance with one embodiment of the present invention. Method 300 may begin by receiving a vector mask store instruction in a processor (block 320). For example, in many implementations a user-level instruction may be received in the processor. In addition to the instruction, source and destination indicators may also be received with the instruction.

Referring still to FIG. 4, at block 325 a mask associated with the instruction may be extracted from the mask register. For example, as described above particular bits each associated with a given data element of a vector data element may be extracted. Further, a flag associated with the instruction may be set. More specifically, a mask store flag may be set to indicate that the corresponding instruction is a vector mask store instruction. Use of this flag will be discussed further below. Then at block 330, a full width store operation may be executed. More specifically, the full width store operation may generate an entry in a memory sub-system of the processor, e.g., a store buffer, memory order buffer or other such memory sub-system component. The entry may include both the micro-operation (i.e., the store operation) as well as the source address and the destination address to which the data is to be stored, and the mask value extracted.

Referring still to FIG. 4, next it may be determined whether an exception occurred during execution of the operation. For example, if a fault should occur during operation (e.g., a page fault segment violation, data breakpoint or so forth), an exception may be generated. Thus at diamond 335 it may be determined whether an exception occurs. If not, control passes to block 340 where an optimized mask store operation may be realized.

More specifically, the partial data of the unmasked portions of the vector data element may be written to the destination storage using the mask values (block 340). That is, for each bit of the vector mask information in the memory sub-system having a first value (e.g., a logic one value), the corresponding vector data element may be written from its source location to the destination location, which may be a cache memory coupled to the memory sub-system, that in turn may be later sent to the final destination location (e.g., main memory).

Referring still to FIG. 4, if an exception is detected, control passes to diamond 350 where it may be determined whether the mask flag (discussed above regarding block 325) is set. If not, the exception was generated for another instruction and thus the exception may be handled with an appropriate exception handler (block 355). For example, a hardware or software exception handler may handle the given fault.

If instead the mask flag is set, control passes to block 360, where an unoptimized (i.e., non-speculative) storing of the requested data may be performed. More specifically, this unoptimized store operation may be performed independently for each individual data element within the source. Thus at block 360, the load operation may be restarted using a microcode slow sequence handler. In this way, unmasked portions of the source may be individually stored into the destination storage. One particular implementation of executing this microcode handler will be discussed further below with regard to FIG. 5.

Thus using the method set forth in the embodiment of FIG. 4, a conditional SIMD packed store may be performed to store a vector data element under mask into a destination storage location. As described above, some implementations may be used to store packed data elements such as packed single-precision or packed double-precision values from a source such as one or more architectural registers, e.g., an extended multimedia register such as a low order portion of a 256-bit register or all of the 256-bit register into a destination storage such as memory (e.g., 128-bit chunks of memory or 256-bit chunks of memory). While described with the particular implementation in the embodiment of FIG. 4, the scope of the present invention is not limited in this regard.

Figure 5:
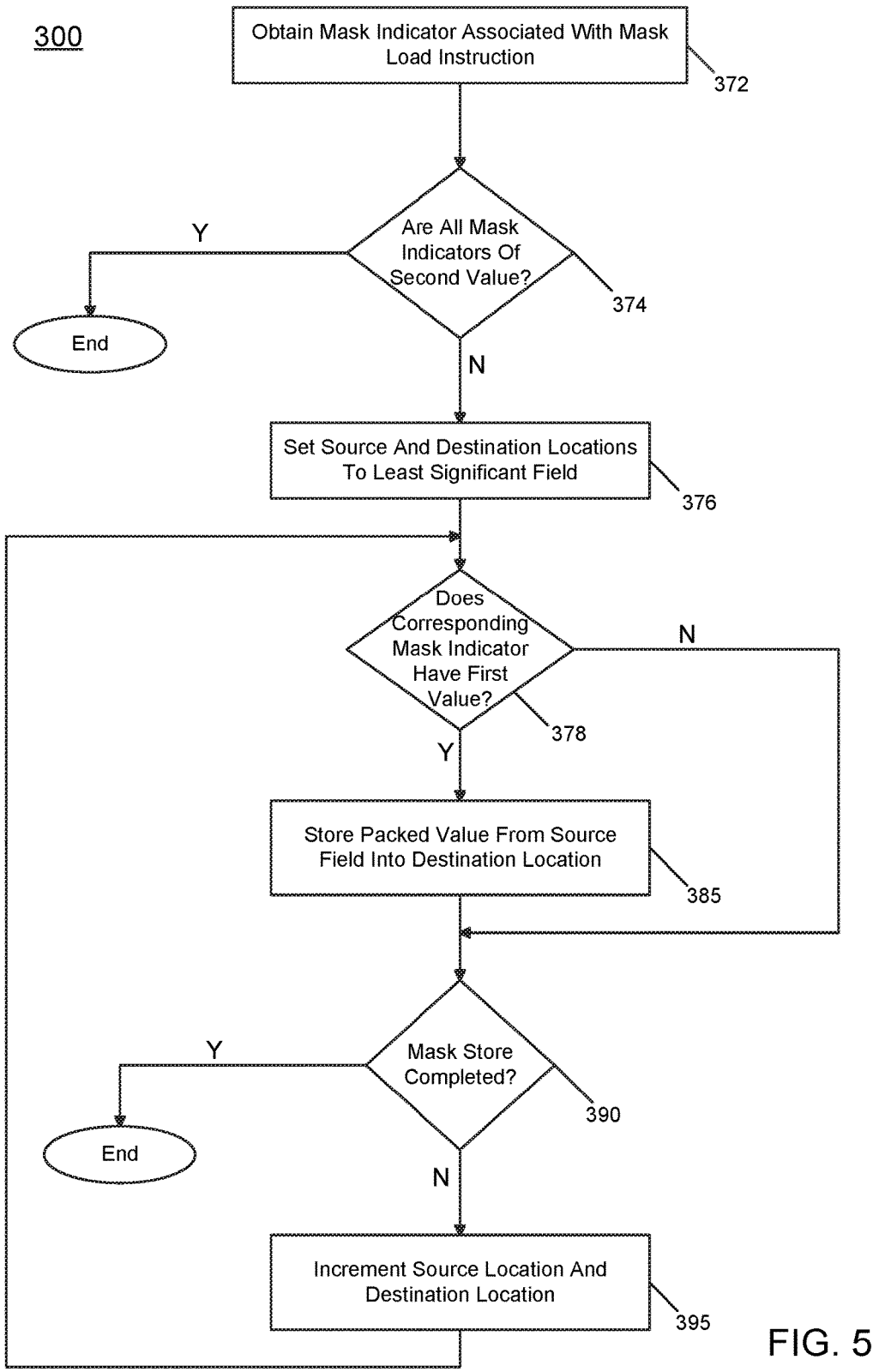
FIG. 5 is a flow diagram of a method for performing a mask store operation in accordance with another embodiment of the present invention.

Referring now to FIG. 5, shown is a flow diagram of a method for performing an unoptimized vector mask store operation in accordance with one embodiment of the present invention. Note that method 370 shown in FIG. 5 may correspond to the unoptimized store operation described above at block 360 of FIG. 4.

As shown in FIG. 5, method 370 may begin by obtaining mask indicators associated with the mask store instruction (block 372). As described above, in one embodiment the mask indicators may each be a single bit associated with a different packed data element of the vector data to be stored. From block 372, control passes to diamond 374 where it may be determined whether all mask indicators are of a second value, e.g., a logic zero value. If all the mask indicators are of the second value, no store operations are needed and method 370 may conclude, thus enabling efficient conclusion of the store operation when all of the data is to be masked.

If at diamond 374 it is determined that all of the indicators are not of the second value, control passes to block 376, where the source and destination locations may be set to a least significant field. For example, assume the destination indicator of the vector mask store instruction is for a memory segment, and thus the destination location may be set to the lowest data element field within that segment, e.g., mem0. Similarly the source location may be a low order of a source register, e.g., register XMM1, e.g., bits [31:0].

Control then passes to diamond 378 where it may be determined whether the corresponding mask indicator for that packed data element has a first value (e.g., a zero value) control may pass to diamond 390. If instead at diamond 378 it is determined that the mask indicator is of a first value, e.g., one value, a store operation may be performed to store the packed value from the source location into the destination field (block 385). Thus a store operation may issue to enable writing of the given packed data element from the source location and storing it into the given portion of the destination location.

At diamond 390, it may be determined whether the store has completed to the destination location. If so, method 370 may conclude. Otherwise, control passes to block 395 where the source location and destination location may be incremented. Control then passes back to diamond 378 for further execution to enable additional packed data elements of the vector data element to be stored into the destination location, if they are unmasked. While shown with this particular implementation in the embodiment of FIG. 5, the scope of the present invention is not limited in this regard.

Referring now to Table 3, shown is a pseudo-code implementation of an example vector mask store operation in accordance with one embodiment of the present invention. More specifically, the pseudo-code shown in Table 3 may correspond to a VMASKMOVPS instruction to perform a 256-bit store operation. As shown, for each individual packed element, which may correspond to packed single-precision data elements, if the corresponding mask bit is of a first value, i.e., "one" value, the data in the source location is stored into the corresponding portion of the destination location. Otherwise no further action is taken for the given data element.

TABLE 3

IF (YMM0[31]) DEST[31:0] = SRC[31:0]
IF (YMM0[63]) DEST[63:32] = SRC[63:32]
IF (YMM0[95]) DEST[95:64] =SRC[95:64]
IF (YMM0[127]) DEST[127:96] = SRC[127:96]
IF (YMM0[159]) DEST[159:128] =SRC[159:128]
IF (YMM0[191]) DEST[191:160] = SRC[191:160]
IF (YMM0[223]) DEST[223:192] =SRC[223:192]
IF (YMM0[255]) DEST[255:224] = SRC[255:224]

Figure 6:
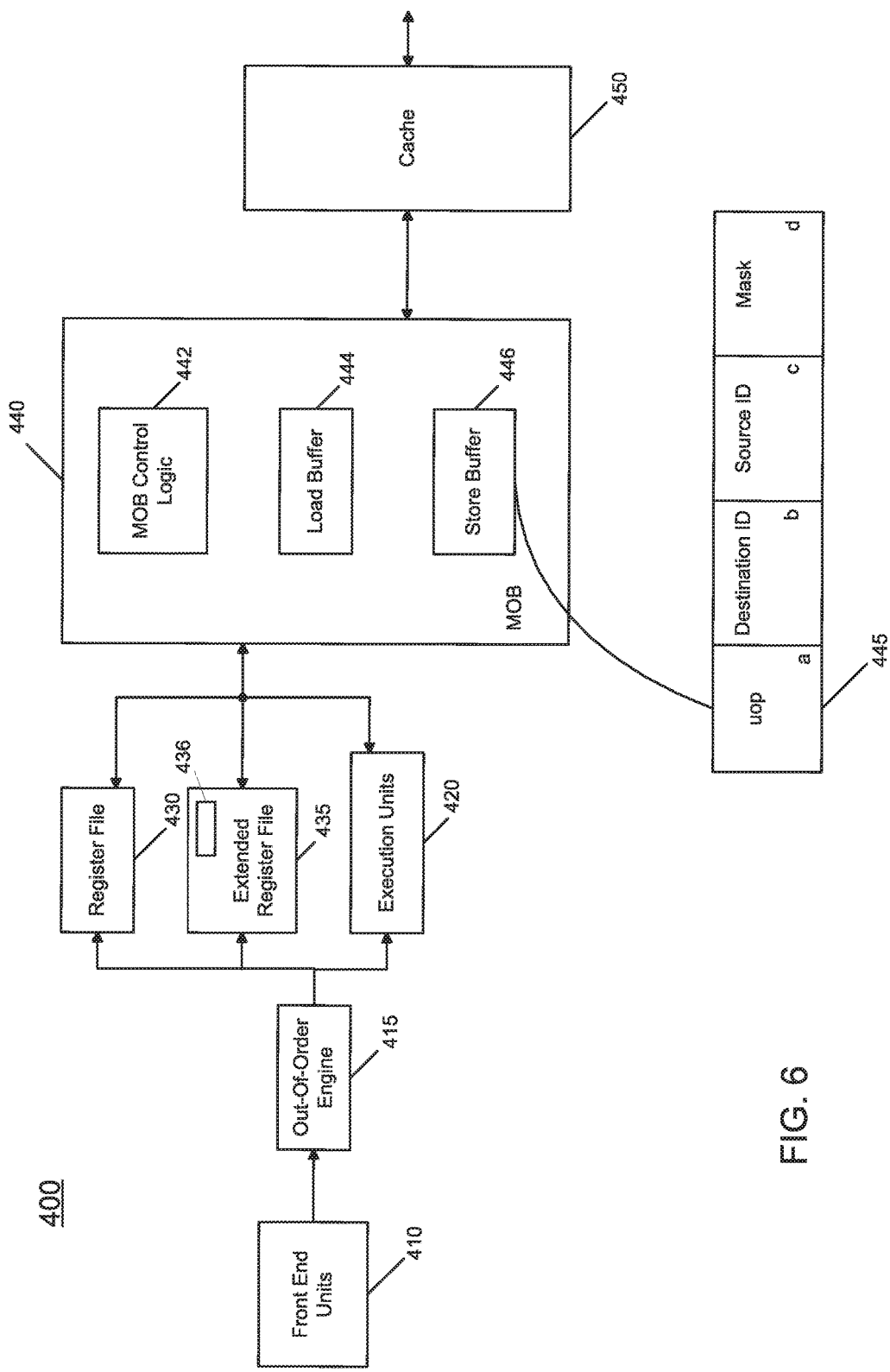
FIG. 6 is a block diagram of a processor in accordance with one embodiment of the present invention.

Referring now to FIG. 6, shown is a block diagram of a processor in accordance with one embodiment of the present invention. As shown in FIG. 6, processor 400 may be a multi-stage pipelined out-of-order processor. Processor 400 is shown with a relatively simplified view in FIG. 6 to illustrate various features used in connection with mask load and store operations as described above.

As shown in FIG. 6, processor 400 includes front end units 410, which may be used to fetch macro-instructions to be executed and prepare them for use later in the processor. For example, front end unit 410 may include an instruction prefetcher, an instruction decoder, and a trace cache, along with micro-code storage as well as an µop storage. The instruction prefetcher may fetch macro-instructions from memory and feed them to instruction decoder to decode them into primitives, i.e., µops for execution by the processor. The trace cache may take decoded µops and assemble then into program ordered sequences for storage into the macro code storage. However, in the case of complex macro-instructions, the micro-code storage may provide the µops needed for the execution of the operation. Of course, additional components and features may be implemented in front end units 410.

Coupled between front end units 410 and execution units 420 is an out-of-order (OOO) engine 415 that may be used to receive the micro-instructions and prepare them for execution. More specifically OOO engine 415 may include various buffers to re-order micro-instruction flow and allocate various resources needed for execution, as well as to provide renaming of logical registers onto storage locations within various register files such as register file 430 and extended register file 435. Register file 430 may include separate register files for integer and floating point operations. Extended register file 435 may include extended registers such as XMM registers (e.g., 128-bit registers) and/or YMM registers (e.g., 256-bit registers), although in some implementations the XMM registers may be accommodated in the low order bits of the YMM registers. Furthermore, a control register 436 may be present in extended register file 435, which may be used to store various mask information. For example, for some mask load and store operations control register 436 may correspond to an XMM0 or YMM0 register which may store mask information from which a mask may be obtained to perform the mask load and store operations.

Various resources may be present in execution units 420, including, for example, various integer, floating point, and SIMD logic units, among other specialized hardware. After micro-instructions are executed in execution units 420, results may be provided to a memory sub-system of the processor, which includes a memory order buffer (MOB) 440 which may include control logic 442, along with a load buffer 444 and a store buffer 446. MOB control logic 442 which may be a controller or the like, is used to control the buffers within MOB 440. Load buffer 444 may be used to store load μops prior to their execution and to track prior loads or other memory operations that must be completed before a given memory operation itself can be completed. Similarly, store buffer 446 may be used to store memory operations, for example, store operations and to track prior memory operations (usually loads) that must be completed before a given memory operation itself can commit. Load buffer 444 may store various information associated with load instructions such as the μop, as well as identifiers for the source and destination locations. Store buffer 446 may include similar information, as well as extended information, including mask information to be used for mask store operations in accordance with an embodiment of the present invention. Shown in FIG. 6 is an entry 445 from store buffer 446 that includes various fields, including a μop field A, a destination identifier field B, a source identifier field C, and a mask field D. Mask field D may include the corresponding mask bits that are used during execution of the store operation to determine whether or not to store the corresponding packed data elements to memory. As shown in FIG. 6, MOB 440 is coupled to a cache 450 which, in one embodiment may be a low level cache (e.g., an L1 cache) although the scope of the present invention is not limited in this regard. From cache 450, data communication may occur with higher level caches, system memory and so forth. While shown with this particular implementation in the embodiment of FIG. 6, the scope of the present invention is not limited in this regard.

Thus as shown in FIG. 6, various components of processor 400, including, e.g., execution units 420 and MOB 440 may include logic to perform vector mask move operations in accordance with an embodiment of the present invention. In this way, instruction set support may be provided for both mask load and store operations. This ISA definition, combined new speculative mask load and store operations may enable a compiler to do more vectorization using mask load and stores without losing performance versus regular unmasked loads and stores.

Figure 7:
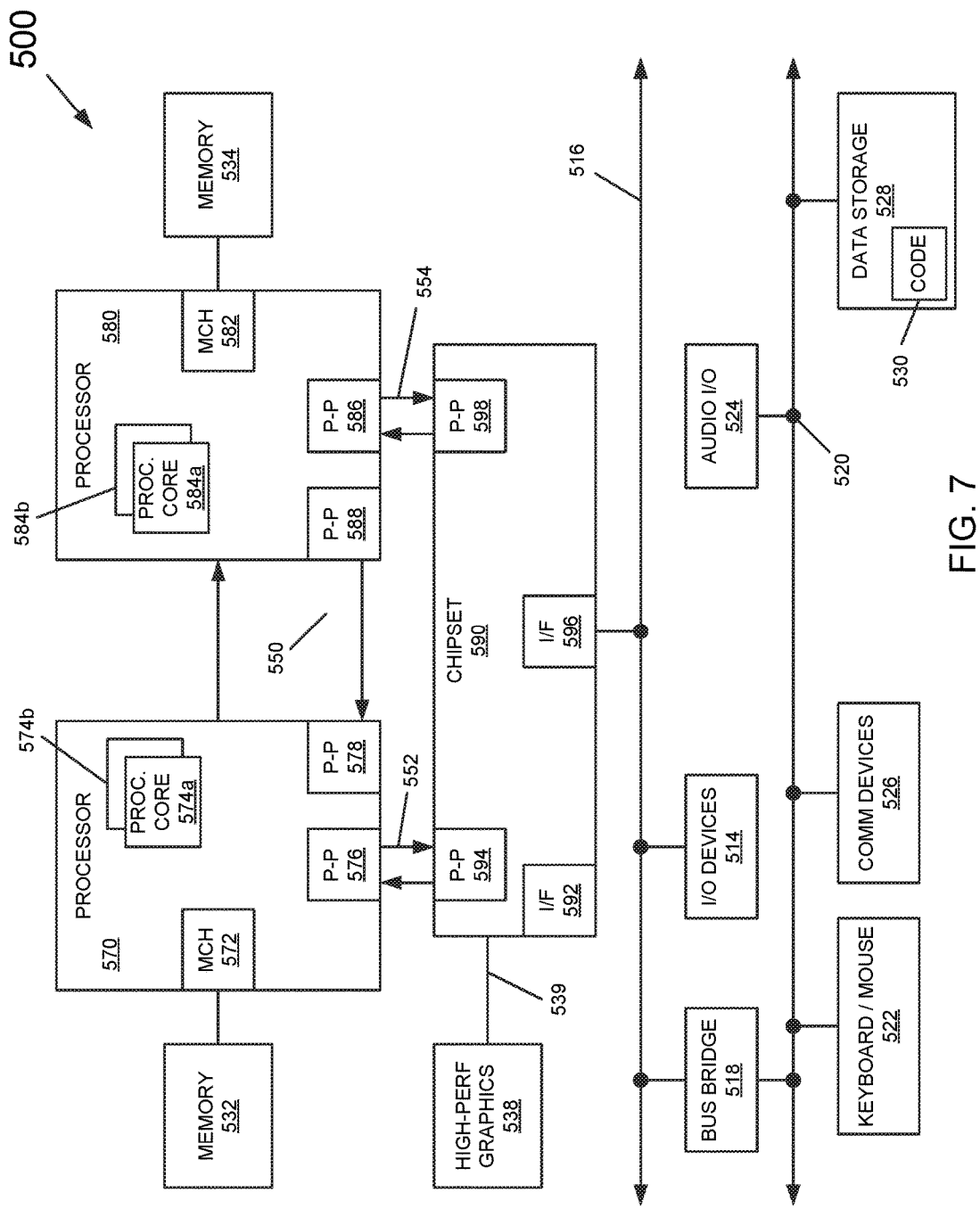
FIG. 7 is a block diagram of a system in accordance with one embodiment of the present invention.

Embodiments may be implemented in many different system types. Referring now to FIG. 7, shown is a block diagram of a system in accordance with an embodiment of the present invention. As shown in FIG. 7, multiprocessor system 500 is a point-to-point interconnect system, and includes a first processor 570 and a second processor 580 coupled via a point-to-point interconnect 550. As shown in FIG. 7, each of processors 570 and 580 may be multicore processors, including first and second processor cores (i.e., processor cores 574a and 574b and processor cores 584a and 584b). Each processor core may include logic such as shown in FIG. 6 to enable execution of single instruction vector mask move operations in accordance with an embodiment of the present invention. In this way full width move operations may be speculatively performed, and then if an exception occurs, a microcode handler stored in the processor may individually perform move operations for each non-masked data element.

Still referring to FIG. 7, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 7, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 7, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a decoder to decode a mask move instruction; and
   an execution unit to execute the mask move instruction to transfer unmasked data elements of a vector data element that is to include a plurality of packed data elements from a source location to a destination location, wherein the mask move instruction is to be executed subject to mask information in a vector mask register and the mask information is to indicate which of the plurality of packed data elements of the vector data element are the unmasked data elements, wherein the execution unit is to issue a full width operation for the plurality of packed data elements of the vector data element, and, after and due to an exception that is to occur during the full width operation, is to perform an individual memory access operation, which is to access main memory, for each of the unmasked data elements one at a time.

2. The processor of claim 1, wherein the processor further comprises a memory subsystem having a store buffer including a plurality of entries each to store a pending instruction, a destination identifier, a source identifier, and mask information if the pending instruction to be stored in the entry is a mask store instruction.

3. The processor of claim 1, wherein the mask move instruction is a mask load instruction that is to include an opcode, a source identifier, and a destination identifier, and wherein the execution unit is to access the vector mask register responsive to the mask load instruction to obtain the mask information.

4. The processor of claim 3, wherein the execution unit is to access a first bit of each of a plurality of fields of the vector mask register to obtain the mask information, wherein each first bit is a mask value for a corresponding one of the plurality of packed data elements of the vector data element.

5. The processor of claim 1, wherein the mask move instruction is a mask load instruction, and the execution unit is to execute a speculative full width load operation as the full width operation to obtain and store the vector data element into a temporary storage and then determine that the exception occurred during the execution of the speculative full width load operation.

6. A processor comprising:
a decoder to decode a mask move instruction; and
an execution unit to execute the mask move instruction to transfer unmasked data elements of a vector data element that is to include a plurality of packed data elements from a source location to a destination location, wherein the mask move instruction is to be executed subject to mask information in a vector mask register and the mask information is to indicate which of the plurality of packed data elements of the vector data element are the unmasked data elements, wherein the execution unit is to issue a full width operation for the plurality of packed data elements of the vector data element, and after an exception is to perform an individual operation for each of the unmasked data elements one at a time, wherein the mask move instruction is a mask load instruction, and the execution unit is to execute a speculative full width load operation as the full width operation to obtain and store the vector data element into a temporary storage and then determine that the exception occurred during the execution of the speculative full width load operation, and wherein the execution unit is to use a microcode handler to said perform the individual operation for said each of the unmasked data elements one at a time.

7. The processor of claim 6, wherein the microcode handler is to determine if all of the mask information is of a second value.

8. A processor comprising:
a decoder to decode a mask load instruction; and
an execution unit to execute the mask load instruction to load unmasked data elements of a vector data element that is to include a plurality of packed data elements from a source memory location to a destination register, wherein the mask load instruction is to be executed subject to mask information that is to indicate which of the plurality of packed data elements of the vector data element are the unmasked data elements, wherein the execution unit is to issue a full width load for the plurality of packed data elements of the vector data element, and when a type of memory for the full width load is un-cacheable the execution unit is to individually load each of the unmasked data elements one at a time.

9. The processor of claim 8, wherein the execution unit is to access a first bit of each of a plurality of fields of a vector mask register to obtain the mask information, wherein each first bit is to correspond to one of the plurality of packed data elements of the vector data element.

\* \* \* \* \*